United States Patent [19]

Hiratsuka et al.

[11] Patent Number: 5,787,244
[45] Date of Patent: Jul. 28, 1998

[54] INFORMATION RETRIEVAL SYSTEM

[75] Inventors: Nobuyuki Hiratsuka, Kawasaki; Akira Horikawa, Okayama, both of Japan

[73] Assignee: Fujitsu Limited, Kawasaki, Japan

[21] Appl. No.: 601,160

[22] Filed: Feb. 13, 1996

[30] Foreign Application Priority Data

Feb. 13, 1995 [JP] Japan ............... 7-024038

[51] Int. Cl.$^6$ ............ G06F 15/16; G06F 13/14; H04L 12/42
[52] U.S. Cl. ............ 395/182.14; 395/200.57; 395/182.17
[58] Field of Search ............ 395/187.01, 200.12, 395/800, 200.14, 831, 333, 182.14, 618, 182.18, 200.62, 200.65, 500, 652, 182.06, 182.03, 182.17, 200.57, 200.31, 182.13; 364/DIG. 1, DIG. 2

[56] References Cited

U.S. PATENT DOCUMENTS

| | | | |
|---|---|---|---|
| 5,333,314 | 7/1994 | Masai et al. | 395/182.14 |
| 5,455,953 | 10/1995 | Russell | 395/197.01 |
| 5,553,239 | 9/1996 | Heath et al. | 395/187.01 |

FOREIGN PATENT DOCUMENTS 4-262469  9/1992  Japan.

*Primary Examiner*—Daniel H. Pan
*Attorney, Agent, or Firm*—Staas & Halsey

[57] ABSTRACT

An information retrieval system of a client/server model for executing communication between a client unit for instructing information retrieval and a server unit for accepting the information retrieval instruction. The client unit includes an abnormality-in-communication detecting unit for detecting the occurrence of an abnormality in communication. A retrieval condition holding unit holds retrieval conditions relating to the information retrieval, that have been inputted up to the point of interruption of the information retrieval, when the server unit enters the state of an abnormal end due to an abnormality in communication and when the information retrieval is interrupted. A retrieval requesting unit reads out the retrieval conditions from the retrieval condition holding unit and sends them to the server unit at the time of restart of the interrupted information retrieval, when the retrieval conditions in the retrieval condition holding unit are judged as necessary. The server unit includes a retrieving unit for executing information retrieval on the basis of the retrieval conditions so read out.

3 Claims, 13 Drawing Sheets

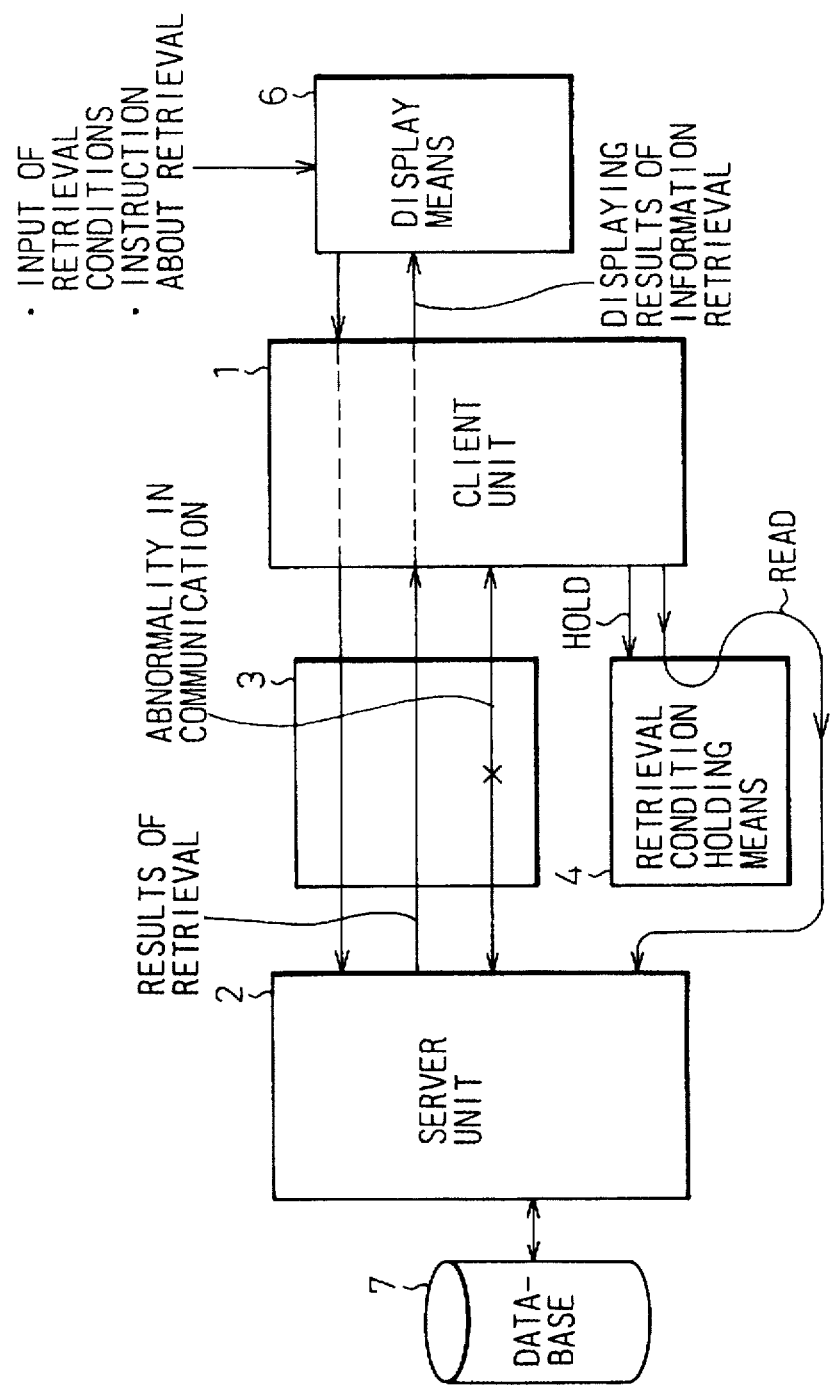

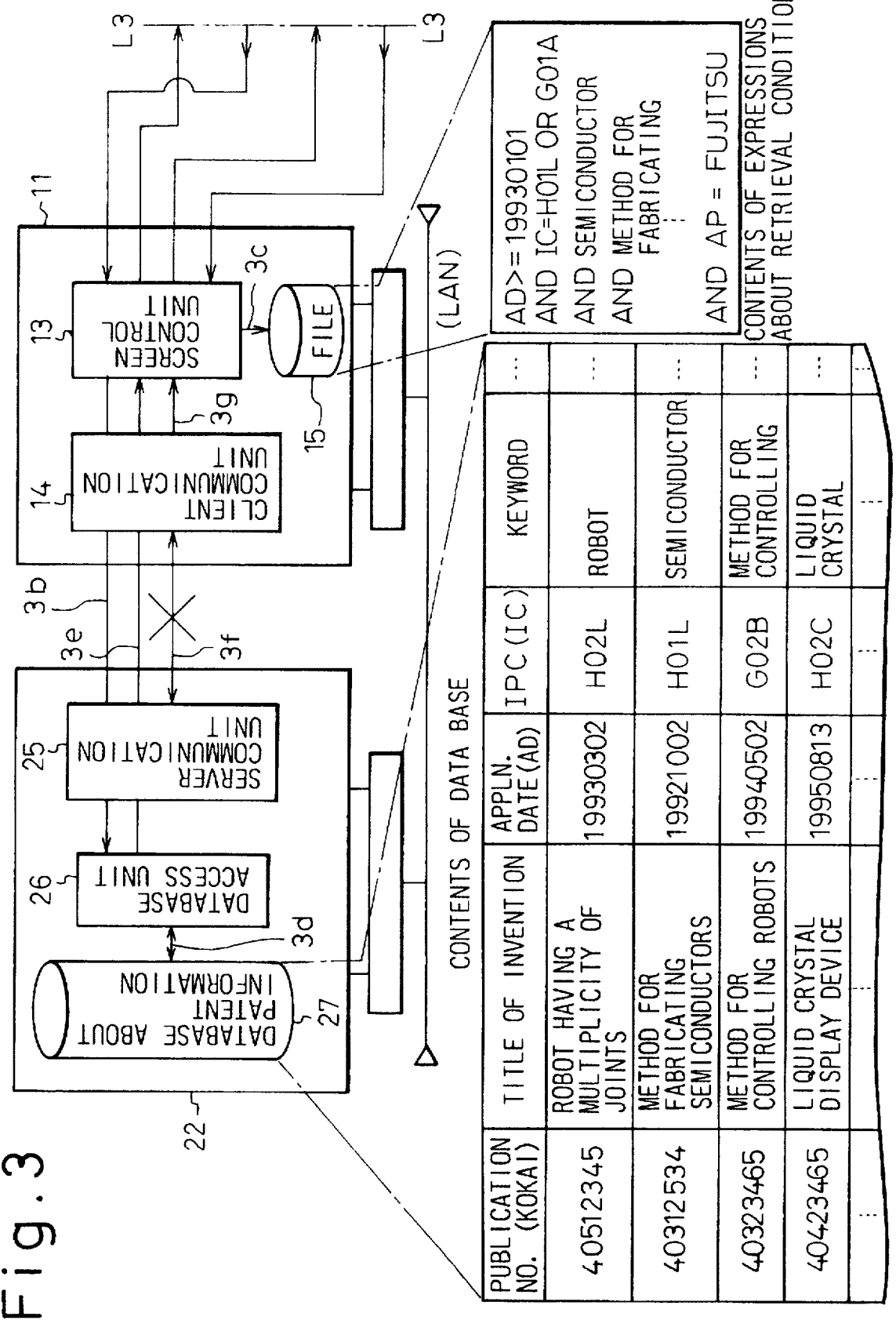

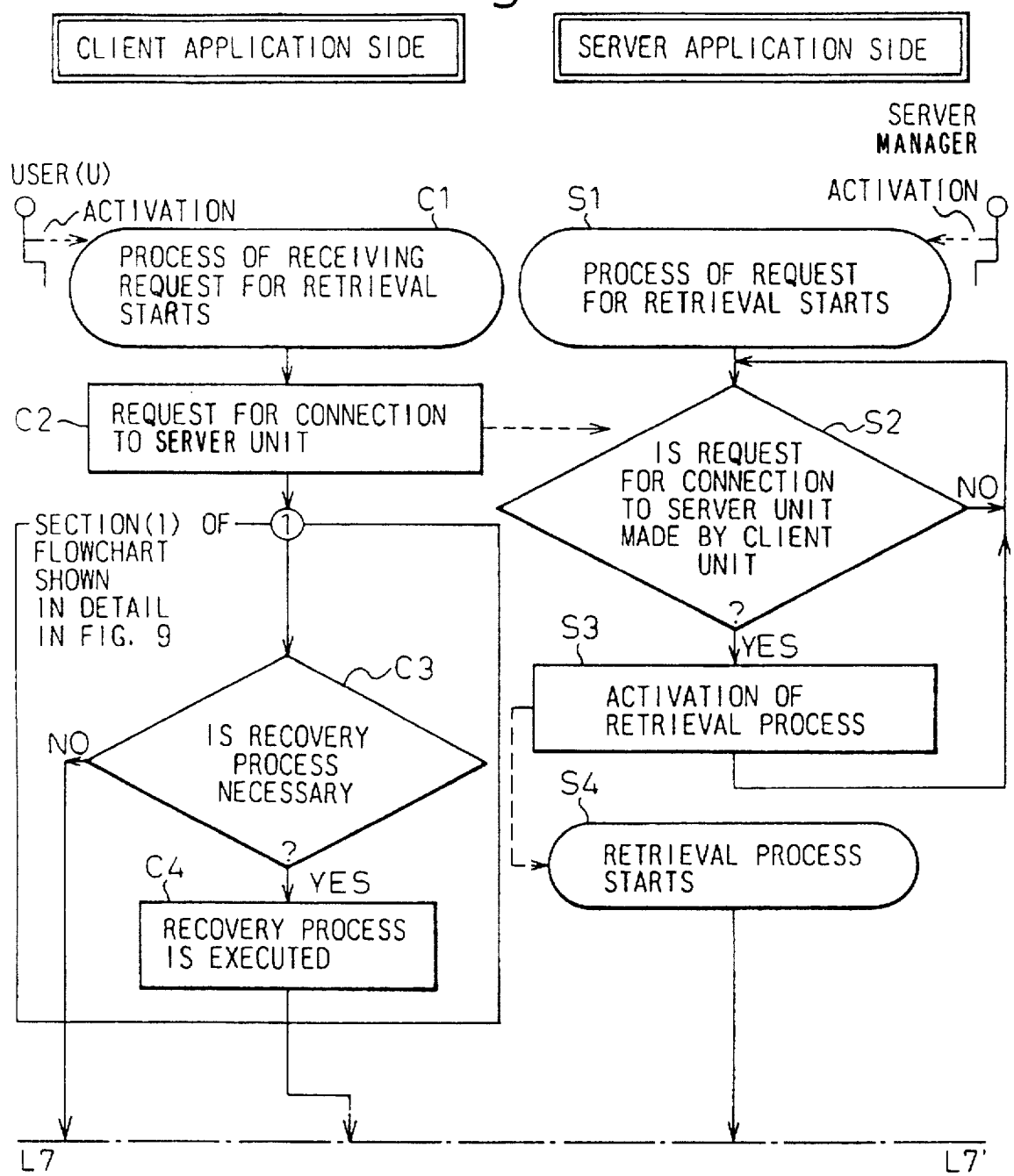

INFORMATION RETRIEVAL SYSTEM

BACKGROUND OF THE INVENTION

1. Field of the Invention

This invention relates to an information retrieval system comprising a client/server model for executing mutual communication between a client side (hereinafter referred to as a "client unit") for instructing an information retrieval process for retrieving an object information and a server side (hereinafter referred to as a "server unit") for accepting the information retrieval instruction from the client unit and executing this process.

More specifically, the present invention relates to a retrieval restart system for efficiently restarting the information retrieval, when any abnormality in communication occurs for some reason or other and an information retrieval process is interrupted in an information retrieval system of a client/server model.

In recent computer systems, a business system has been predominantly built up by a client/server model capable of efficiently executing complex business processes, by effecting mutual and close cooperation between a server unit including an application program having a role of collectively managing information and resources and offering them and a client unit including an application program having a role of making a request to the server unit and utilizing the information and resources described above. Some effects can be expected in a client/server model by applying it to an information retrieval system (for example, a patent information retrieval system for retrieving patent information covering patents), in particular, wherein users input large quantities of complicated expressions about retrieval conditions on a trial-and-error basis so as to retrieve the desired information (i.e., objective information).

2. Description of the Related Art

In an information retrieval system using a client/server model, an application program on the client side (generally called briefly the "client application" or the "client AP") and an application program on the server side (generally called briefly the "server application" or the "server AP") input large quantities of complicated expressions about retrieval conditions on a trial-and-error basis by executing mutual communication (application communication) and thus execute a series of information retrieval operations.

If the server application, etc., enters an abnormal end or a compulsive end for some reason or other during a series of such operations, communication between the server application and the client application becomes impossible and the retrieval operation is interrupted. When the user starts again the operation after this interruption, the user cannot utilize the information such as the expressions about the retrieval conditions, etc., which have been acquired by the server application immediately before the interruption of the operation, because such information has disappeared. Therefore, the user must execute once again from the very beginning the information retrieval process by instructing again the information retrieval process from the client application to the server application.

As described above, in the conventional information retrieval system of the client/server model, the desired information must be sought out without omission from an enormous amount of information that is collectively managed on the server side. Therefore, the user must input large quantities of complicated expressions about the retrieval conditions on a trial-and-error basis within an extended period of time.

When any abnormality in communication occurs for some reason or other in the server unit under communication with the client unit during the utilization of such an information retrieval system and the client/server model enters an abnormal end or a compulsive end to stop the system operation, it has been necessary in the prior art for the user to input again from the beginning the same expressions about the retrieval conditions so as to restart the interrupted operation.

Therefore, the conventional method, which inputs once again the same expressions about the retrieval conditions so as to restart the operation of the information retrieval system that was interrupted for some reason or other, is extremely inefficient.

Speaking generally, the expressions about the retrieval conditions which have been transmitted from the client side to the server side up to the point immediately before the interruption of the operation are those conditions which the user has inputted on the trial-and-error basis. For this reason, the user himself does not sufficiently remember, in many cases, the conditions he has inputted.

Particularly when the object information is retrieved by the designation of the client unit, enormous quantities of complex expressions about the retrieval conditions are continuously handled, and the problem described above becomes more severe when the communication is cut off at the stage where large quantities of information are retrieved and the desired information will be acquired in a short time.

To cope with such a problem, Japanese Unexamined Patent Publication (Kokai) No. 4-262469, for example, discloses an electronic filing system using one general-purpose computer which stores the information relating to the interrupted operation such as the retrieval conditions when an operator (user) interrupts the operation, and immediately restarts the operation from the interrupted state on the basis of this stored information. However, the operation restarting method in the electronic filing system described above can be applied only to the case in which the operator uses the program of one general-purpose computer, but cannot be easily applied to the restart of the operation when the operation is interrupted while the operations are continuously processed between the application programs which are dependent on both the client unit and the server unit. In other words, the prior art shown in Japanese Unexamined Patent Publication (Kokai) No. 4-262469 does not at all take any countermeasure against an abnormality in communication when the computer system is divided into the client application and the server application.

SUMMARY OF THE INVENTION

The present invention is completed in view of the problems described above, and is directed to provide an information retrieval system which can improve the efficiency and the ease of the restart operation when the server, etc., in the client/server model enters the state of an abnormal end or a compulsive end for some reason or other, by utilizing again the expressions about the retrieval conditions, that have been inputted by the client unit, at the restart of the operation.

To accomplish the object described above, the present invention provides an information retrieval system which is so constituted as to effect mutual communication between a client unit for instructing information retrieval for retrieving an objective information and a server unit for accepting the information retrieval instructed from the client portion. The client unit includes abnormality-in-communication detecting means for detecting the occurrence of an abnormality in communication; retrieval condition holding means for holding the retrieval conditions relating to the information retrieval, that have been inputted up to the point of interruption of the information retrieval, when the client/server model enters the state of an abnormal end or a compulsive end due to an abnormality in communication and the information retrieval is interrupted; and retrieval requesting means for reading out the retrieval conditions from the retrieval condition holding means and transmitting them to the server unit, when the retrieval conditions held by the retrieval condition holding means are judged as necessary and the interrupted information retrieval is restarted. Further, the server unit includes retrieving means for executing the information retrieval on the basis of the retrieval conditions read out from the retrieval condition holding means.

Preferably, the client unit erases the retrieval conditions held by the retrieval condition holding means when the retrieval conditions held by the retrieval condition holding means are judged as unnecessary in the information retrieval system according to the present invention.

Further preferably, the information retrieval system according to the present invention includes display means for displaying the retrieval condition and the results of retrieval of the server unit corresponding to the retrieval conditions.

According to the information retrieval system of the present invention, the retrieval conditions inputted by the user so as to retrieve the information, such as a plurality of kinds of expressions about the retrieval conditions, are transmitted from the client unit to the server unit, and in this instance, these expressions about the retrieval conditions are sequentially stored as a history in the retrieval condition holding means.

Here, when the server unit enters for some reason or other the state of an abnormal end and the information retrieval is interrupted, the abnormality-in-communication detecting means on the client unit side can detect this abnormal end of the server unit as an abnormality in communication. Therefore, the client unit can make the user select whether or not the history of the expressions about the retrieval conditions once held in the retrieval condition holding means such as a retrieval condition holding file is required. If the instruction from the user represents that the history of the expressions about the retrieval conditions is necessary, the contents of the retrieval condition holding means is adopted and left as such, and when the instruction of the user represents that it is not necessary, the history of the expressions about the retrieval condition once held in the retrieval condition holding means is erased.

Further, when the user adopts the contents of the retrieval condition holding means so as to restart the interrupted information retrieval when the next information retrieval is effected, the user designates the retrieval condition holding means and merely gives the information retrieval instruction to the client unit. Then, the retrieval requesting means of the client unit reads out a plurality of kinds of expressions about the retrieval conditions saved in the retrieval condition holding means and transmits them to the server unit. Further, the retrieving means of the server unit retrieves a database, etc., on the basis of the expressions about the retrieval conditions read out from the retrieval condition holding means. The client unit receives the results of retrieval by the retrieving means of the server unit, and notifies the results of retrieval to the user. In this way, the client/server model can be restored to the state before the interruption.

In summary, the present invention sequentially holds the expressions about the retrieval conditions as the history in the retrieval condition holding means disposed on the client unit side when the server unit enters the state of the abnormal end for some reason or other and the information retrieval is interrupted, utilizes these expressions about the retrieval conditions at the time of restart of information retrieval, and eliminates the necessity for inputting once again from the beginning the same expressions about the retrieval conditions at the restart of the information retrieval. Therefore, the present invention can improve the efficiency of the information retrieval process at the time of restart.

BRIEF DESCRIPTION OF THE DRAWINGS

The above object and features of the present invention will be more apparent from the following description of the preferred embodiments with reference to the accompanying drawings, wherein:

FIG. 1 is a block diagram showing the construction of one embodiment based on the principle of the present invention;

FIG. 3 is a block diagram showing the construction No. 1 for holding expressions about retrieval conditions at the abnormal end of the operation in another concrete embodiment of the present invention;

FIG. 7 is a flowchart for explaining the overall process flow No. 1 in a concrete embodiment of the present invention;

DESCRIPTION OF THE PREFERRED EMBODIMENTS

Figure 2A:
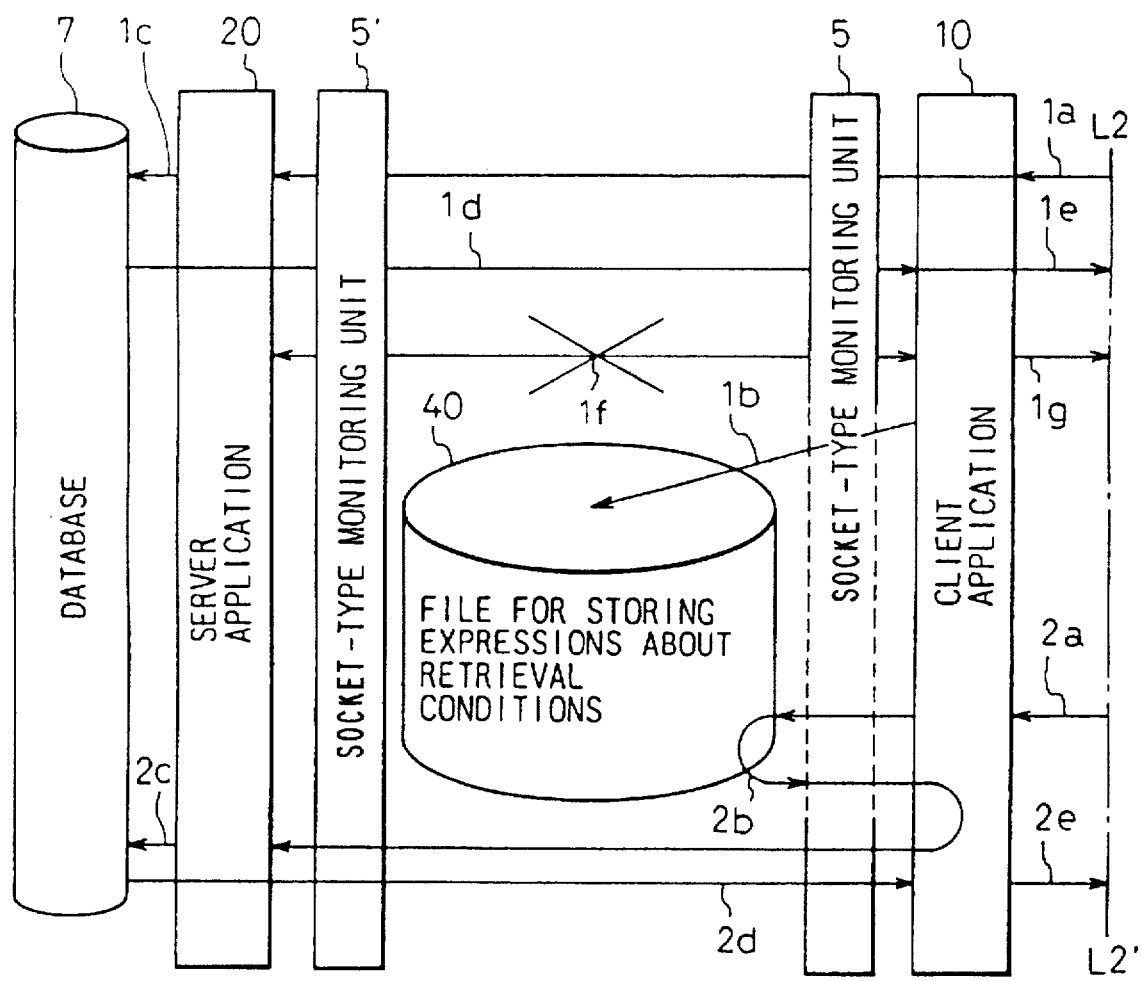
FIG. 2A is a block diagram showing the construction No. 1 of a concrete embodiment of the information retrieval system according to the present invention.

Hereinafter, a detailed description regarding preferred embodiments of the present invention will be given with reference to FIGS. 1 to 11.

In an information retrieval system in a client/server model for executing mutual communication between a client unit 1 for instructing information retrieval for retrieving an objective information and a server unit 2 for accepting the information retrieval instructed from the client portion 1, an embodiment of the information retrieval system shown in FIG. 1 comprises abnormality-in-communication detecting means 3 for notifying the occurrence of an abnormality in communication; retrieval condition holding means 4 for holding retrieval conditions regarding the information retrieval, that have been inputted up to the point in time of the interrupt of this information retrieval, when the client/server model enters an abnormal end or a compulsive end and this information retrieval is interrupted due to an abnormality in communication; and retrieval requesting means for reading the retrieval condition from the retrieval condition holding means and transmitting it to the server unit 2, when the retrieval condition held by the retrieval condition holding means 4 is judged as necessary and the interrupted information retrieval is restarted.

Further, the server unit 2 includes retrieving means for executing information retrieval on the basis of the retrieval condition read out from the retrieval condition holding means 4.

In this case, retrieval requesting means and the retrieving means are not particularly shown in FIG. 1.

When the retrieval condition held by the retrieval condition holding means 4 is judged as unnecessary, the client unit 1 preferably erases the retrieval condition held by the retrieval condition holding means 4.

Further preferably, the embodiment of the information retrieval system according to the present invention shown in FIG. 1 includes display means 6 for displaying the retrieval condition described above and the result of the retrieval of the server unit 2 corresponding to this retrieval condition.

According to the embodiment of the information retrieval system of the invention shown in FIG. 1, when the retrieval condition inputted by a user so as to retrieve information such as a plurality of kinds of retrieval condition expressions, is transmitted from the client unit 1 to the server unit 2, these retrieval condition expressions are sequentially held as the history in the retrieval condition holding means 4.

When the server unit 2 finishes abnormally and interrupts the information retrieval for some reason or other, the abnormality-in-communication detecting means 3 on the client unit side can detect the abnormal end in the server unit 2 as an abnormality in communication. Therefore, the client unit 1 can make the user select whether the history of the retrieval condition expressions once held in the retrieval condition holding means 4 such as a retrieval condition expression holding file, etc., is necessary or unnecessary. When the instruction from the user represents that the history of the retrieval condition expressions is necessary, the preserved contents of the retrieval condition expression holding means 4 is employed and is left as such, and when it represents that the history is unnecessary, the history of the retrieval condition expressions once held in the retrieval condition holding means is erased.

When the user employs the preserved contents of the retrieval condition holding means 4 when executing next time the information retrieval so as to restart the interrupted information retrieval, the user needs only to designate the retrieval condition holding means 4 and to give the information retrieval instruction to the client unit 1. Then, the retrieval requesting means of the client unit 1 reads a plurality of kinds of retrieval condition expressions stored in the retrieval condition holding means 4 and sends them to the server unit 2. Further, the retrieving means of the server unit 2 retrieves a database 7, etc., on the basis of the expressions about the retrieval conditions read out from the retrieval condition holding means 4. The client unit 1 receives the results of retrieval by the retrieving means of this server unit 2 and sends the results to the user. In this way, the client/server model can be recovered to the state before the interruption.

As described above, in the embodiment of the present invention shown in FIG. 1, when the server unit enters the abnormal end for some reason or other and the information retrieval is interrupted, the expressions about the retrieval conditions are sequentially stored as the history in the retrieval condition holding means, and these expressions about the retrieval conditions are reutilized when the information retrieval is restarted. Therefore, the same expression about the retrieval conditions need not be inputted again from the beginning at the restart of the information retrieval, and the information retrieval operation can be made more efficient at the restart.

Figure 2B:
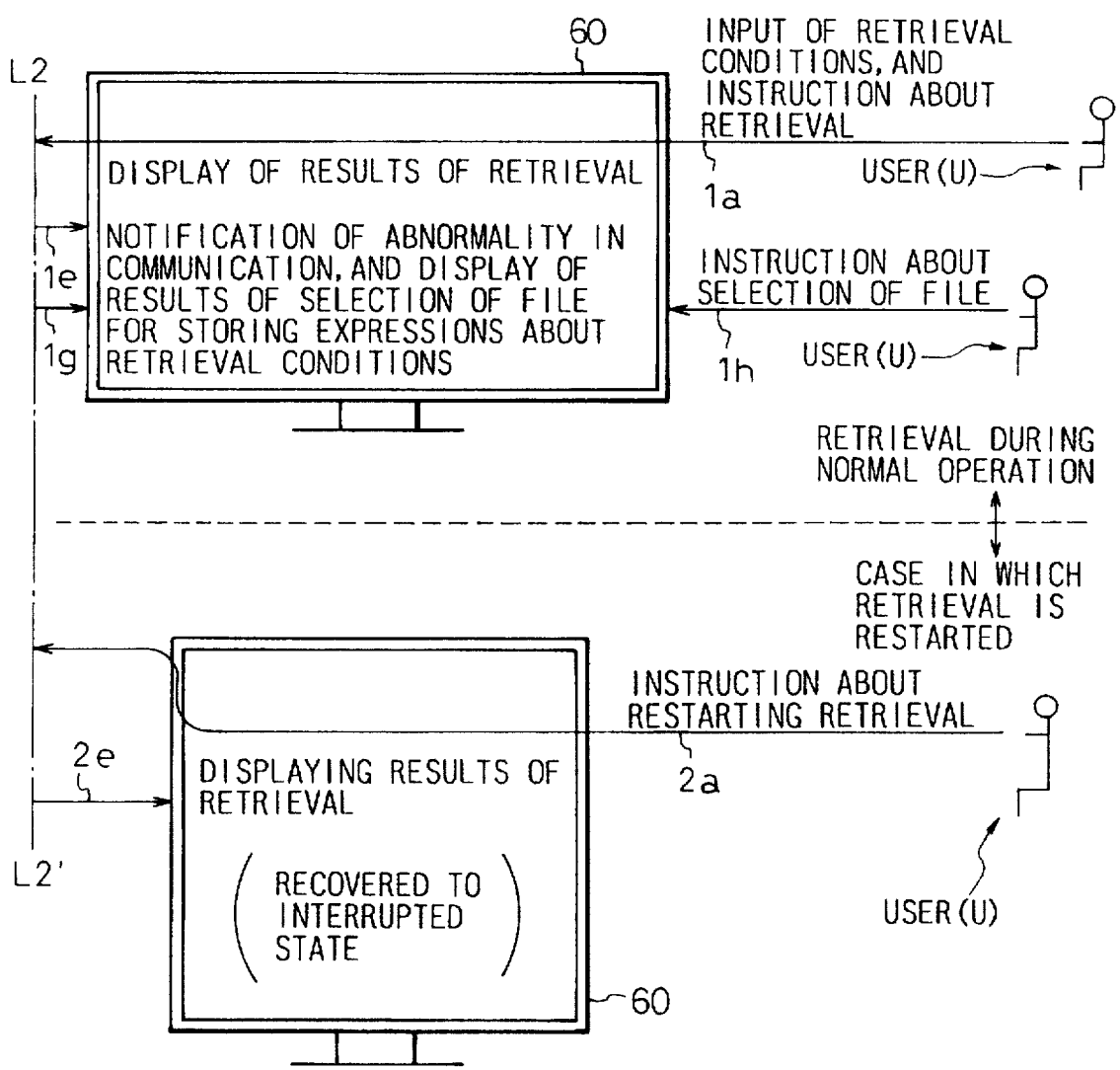
FIG. 2B is a block diagram showing the construction No. 2 of a concrete embodiment of the information retrieval system according to the present invention.

FIGS. 2A and 2B are block diagrams each showing the definite construction of the information retrieval system of a concrete embodiment of the present invention. Hereinafter, like reference numerals will be used to identify like constituent members as those described above.

In FIG. 2A, the client unit 1 of the client/server model includes a client application 10 as retrieval requesting means, and the server unit 2 includes a server application 20 as the retrieving means. In FIG. 2B, a display 60 comprising a cathode ray tube (CRT) or a liquid crystal display device (LCD) is used as the display means 6 (see FIG. 1) for displaying the expressions about the retrieval conditions, the results of retrieval, etc., on the screen.

The client application 10 shown in FIG. 2A has the functions of inputting a plurality of kinds of retrieval condition expressions (i.e., expressions about retrieval conditions) from the user U through the display 60 (see FIG. 2B), transmitting these retrieval condition expressions to the server application 20, receiving the results of retrieval from the server application 20 and causing the display 60 (see FIG. 2B) to display the results of retrieval.

On the other hand, the server application 20 has the functions of receiving the retrieval condition expressions from the client application 10, retrieving the database 7 storing the information as the object of retrieval, and transmitting the results of retrieval obtained from the database 7 to the client application 10.

Further, the client application 10 is provided with a retrieval condition expression holding file 40 for storing expressions about retrieval conditions comprising a disk device, etc., as the retrieval condition holding means 4 (see FIG. 1). This retrieval condition expression holding file 40 sequentially holds the expressions about the retrieval conditions inputted from the user U.

Further, the client application 10 and the server application 20 are provided with socket-type monitoring units 5, 5' as abnormality-in-communication detection means 3 (see FIG. 1), respectively. Each socket-type monitoring unit 5, 5' corresponds to concrete means for executing application communication between the client application 10 and the server application 20. A signal is periodically sent from a socket so as to particularly detect an abnormality in communication on the server application (20) side. When any abnormality in communication is found on the side of the server application 20, an interrupt is generated so that the server application 20 is compulsively brought into the abnormal end or the compulsive end.

The explanation will be given in further detail. When the client application 10 transmits the retrieval condition expressions inputted from the user U by the retrieval instruction in the flow of signals 1a shown in FIG. 2A, the retrieval condition expressions are sequentially stored as the history in the retrieval condition expression holding file 40, as shown in the flow of signals 1b. At this time, as represented by the flow of signals 1c, the database 7 storing the information as the object of retrieval is retrieved on the basis of the expressions about the retrieval conditions sent to the server application 20 through the socket-type monitoring units 5, 5', and the results of retrieval obtained from the database 7 are sent back to the client application 10 as represented by the flow of signals 1d. Further, the results of retrieval are displayed on the display (see FIG. 2B) as represented by the flow of signals 1e.

Here, if the server application 20 enters for some reason or other the abnormal end and the information retrieval is interrupted, this abnormal end of the server application 20 can be detected as an abnormality in communication on the side of the client application 10 as represented by the flow of signals 1f. Therefore, the user U is allowed to select whether or not the history of the retrieval condition expressions inputted by the client application 10 and stored in the retrieval condition expression holding file 40 is employed, as represented by the flow of signal 1g. The flow of signals 1h in FIG. 2B represents the instruction from the user U as to whether or not the file is employed. When the instruction represents that the existing retrieval conditions are employed, the preserved contents of the retrieval condition expression holding file 40 is left as such, and when it represents that they are not employed, the preserved contents of the retrieval condition expression holding file 40 is erased, and the operation of the client application 10 is finished.

Further, when the retrieval condition holding file 40 is designated when the next retrieval is effected by the information retrieval restart instruction from the user U represented by the flow of signals 2a, the retrieval instruction is executed for the client application 10. Further, the client application 10 reads out the retrieval condition expressions stored in the retrieval condition expression holding file 40 and sends them to the server application 20 as represented by the flow of signals 2b. The database 7 is retrieved by the server application 20 as represented by the flow of signals 2c, and the results of retrieval of the database 7 are received by the client application 10 as represented by the flow of signals 2d. Finally, the results of retrieval are displayed for the user U through the display 60 (see FIG. 2B) as represented by the flow of signals 2e, and the client/server model restores to the state before the interruption.

In the embodiment described above, the abnormality-in-communication detecting function is provided to the socket which is originally necessary for the application communication between the client application and the server application, and an auxiliary memory device such as a disk device, which is originally provided to the information retrieval system comprising a computer system, can be utilized as the retrieval condition expression holding file. Therefore the function at the restart of the information retrieval according to the present invention can be accomplished without increasing the hardware for the information retrieval system.

Figure 4:
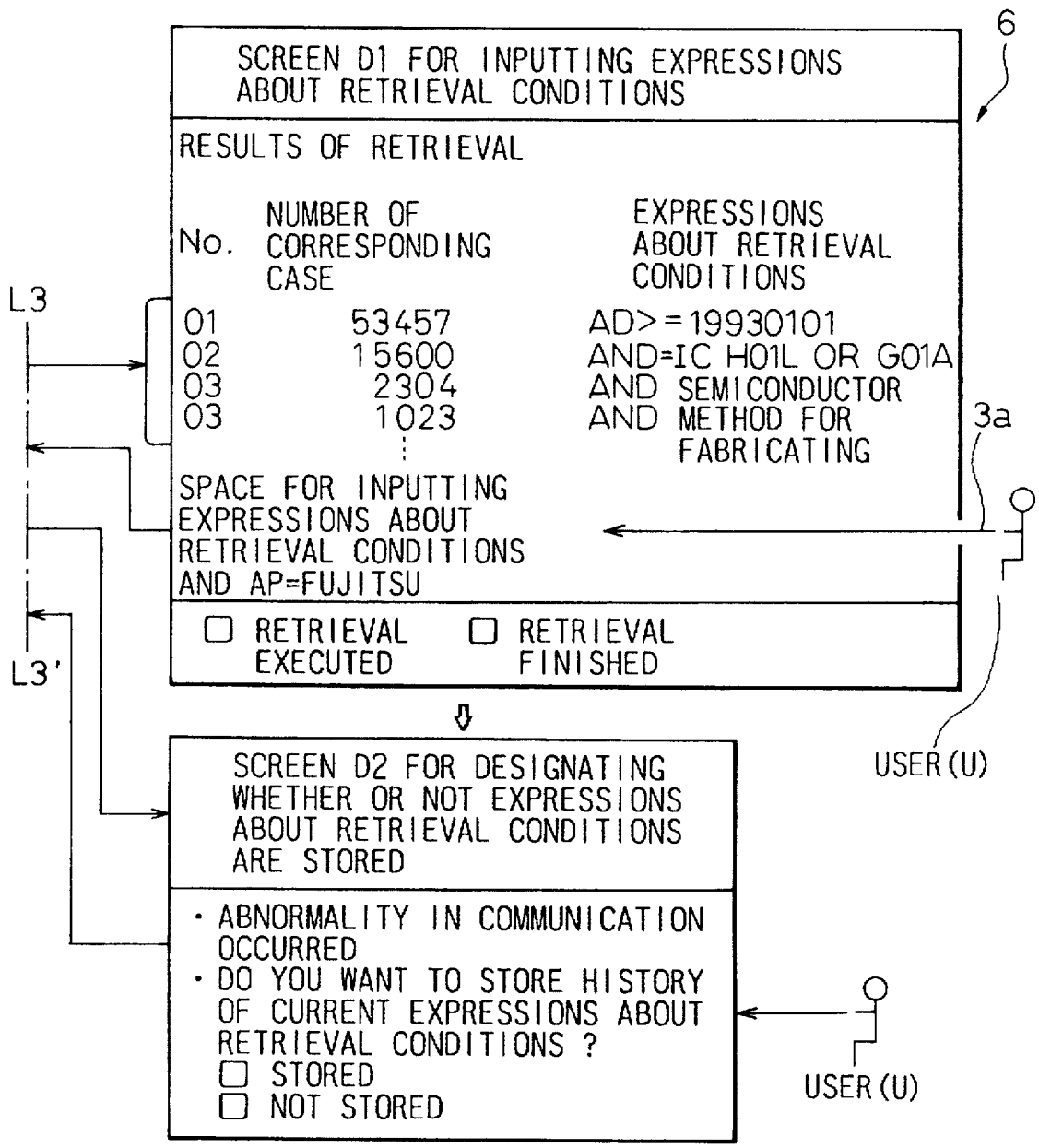
FIG. 4 is a block diagram showing the construction No. 2 for holding the expressions about retrieval condition at the abnormal end of the operation in another concrete embodiment of the present invention.

FIGS. 3 and 4 are block diagrams Nos. 1 and 2 showing the constructions for holding the retrieval condition expressions at the end of abnormality in another concrete embodiment of the present invention, respectively. Here, the drawings illustrate the hardware constructions when the present invention is applied to a patent information retrieval system for retrieving patent information relating to patents.

As shown in FIGS. 3 and 4, the patent information retrieval system includes a client computer 11 related with the client application and a server computer 22 related with the server application.

The client computer 11 includes a screen control unit 13 for controlling the screen of the display means 6 such as a display; a file 15 for storing expressions about retrieval conditions relating to the patent information retrieval; and a client communication unit 14 inclusive of the socket for mutual communication with the server computer 22 by utilizing a LAN (Local Area Network), etc.

On the other hand, the server computer 22 includes a server communication unit 25 inclusive of a socket, etc., for the mutual communication with the client computer 11; a database 27 about patent information as a database 7 (see FIG. 2A) which stores in advance patent information such as Publication (Kokai) Numbers of various patents, titles of invention, application dates, international patent classification (IPC), keywords, etc.; and a database access unit 26 for selectively taking out the patent information as the retrieval object from this patent information database 27.

In FIG. 4, further, symbol D1 represents the screen for inputting the retrieval condition expressions of the display means 6 such as a display, and is used by the user U for inputting a plurality of kinds of retrieval condition expressions and displaying the results of retrieval from the server unit. Symbol D2 represents the screen for designating the retrieval condition expression storage of the display means. When any abnormality occurs during communication with the server computer of the server unit, the screen D2 allows the user U to confirm once again whether or not the retrieval condition expressions once stored in the retrieval condition expression holding file 15 are preserved.

The screens D1 and D2 described above are controlled by the screen control unit 13 inside the client computer 11. Further, the messages between the server computer 22 of the server unit and the client computer 11 of the client unit such as the expressions about the retrieval conditions and the results of this retrieval are exchanged through the server communication unit 25 and the client communication unit 14. The retrieval condition expression holding file 15 corresponds to the retrieval condition expression holding file 40 of FIG. 2A, and is used for holding the expressions about the retrieval condition inputted by the user U through the screen D1 and for holding the retrieval condition expression holding file outputted from the screen control unit 13.

When it is desired to retrieve the objective patent information, the screen control unit 13 first transmits (the flow of signals 3b) the expressions about the retrieval conditions (the flow of signals 3a) inputted by the user U on the screen D1 of the display means 6 shown in FIG. 4 to the database access unit 26 through the client communication unit 14 and the server communication unit 25. The screen control unit 13 adds the expressions about the retrieval conditions inputted by the user U to the retrieval condition expression holding file 15 as the history (the flow of signals 3c). An example of the contents of the expressions about the retrieval conditions in the retrieval condition expression holding file 15 is shown, magnified, in the lower part of FIG. 3. Next, the database access unit 26 retrieves the patent information database 27 on the basis of the expressions about the retrieval conditions transmitted from the screen control unit 13 (the flow of signals 3d), and transmits the number of corresponding cases as the results of retrieval to the screen control unit 13 through the server communication unit 25 and the client communication unit 14 (the flow of signals 3e). Further, the screen control unit 13 displays the expressions about the retrieval conditions and the number of the corresponding cases inputted onto the screen D1, on this screen D1 as the history.

When the server application (server communication unit 25 and database access unit 26) enters for some reason or other the abnormal end state during the process of the patent information retrieval described above, the client communication unit 14 notifies an abnormality in communication (the flow of signals 3f). Therefore, whether or not the contents of the history of the retrieval condition expression holding file 15 should be stored as such is displayed on the screen D2 for designating storage of the expressions about the retrieval conditions from the client communication unit 14 through the screen control unit 13 at the detection timing of this abnormality in communication (the flow of signals 3g). Here, the contents of the retrieval condition expression holding file 15 are not erased, only when the instruction is given from the user U so as to leave the contents of the history as they are, and the operation of the client application (client communication unit 14 and screen control unit 13) is finished.

Figure 5:
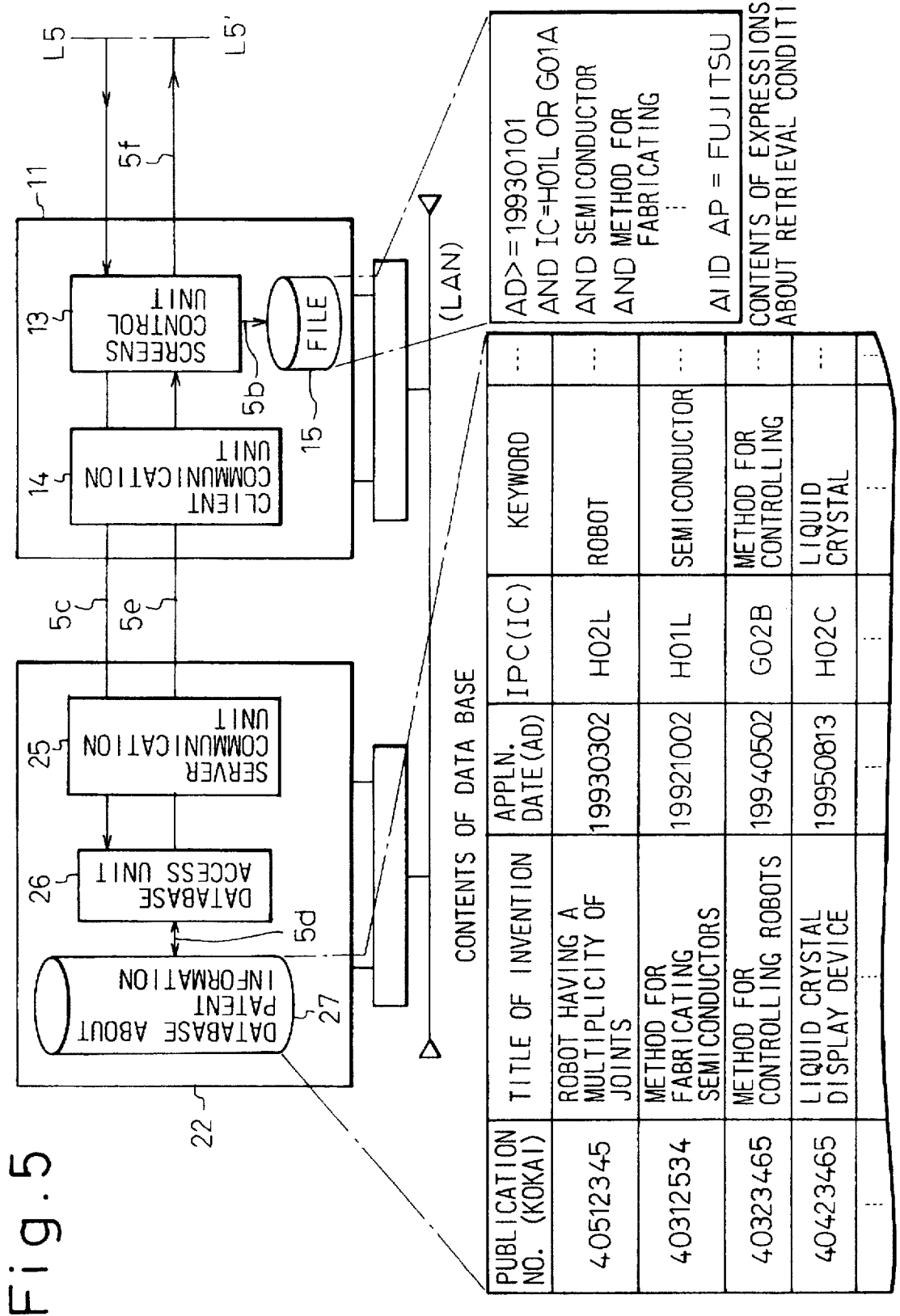
FIG. 5 is a block diagram showing the construction No. 1 for recovering the state to the state where retrieval is interrupted, at the restart of retrieval in another concrete embodiment of the present invention.
Figure 6:
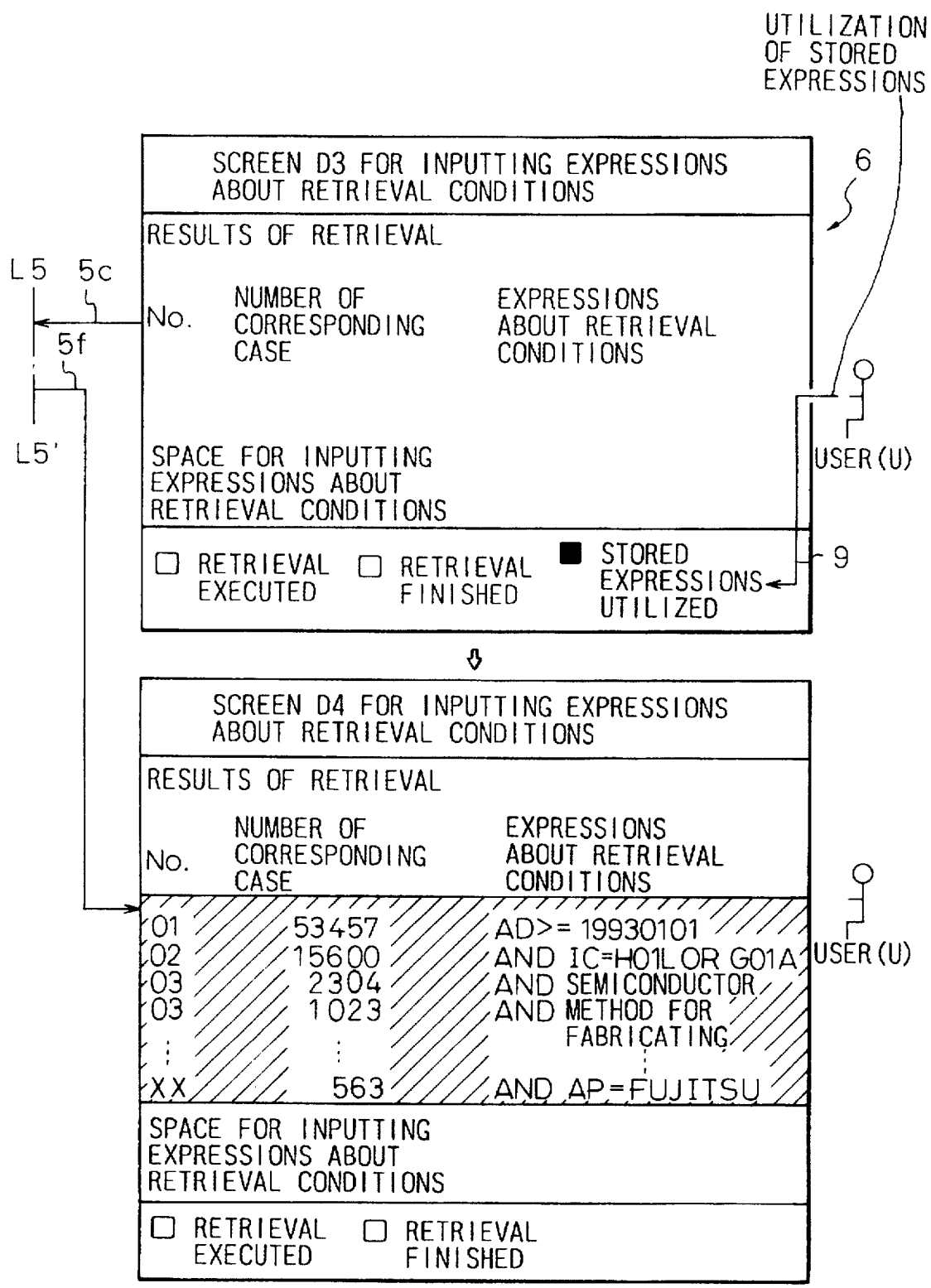
FIG. 6 is a block diagram showing the construction No. 2 for recovering the state to the state where retrieval is interrupted, at the restart of retrieval in another concrete embodiment of the present invention.

FIGS. 5 and 6 are block diagrams Nos. 1 and 2 showing the construction for restoring to the normal state when retrieval is interrupted at the time of restart of retrieval in another concrete embodiment of the present invention, respectively. The drawings show the hardware construction when the present invention is applied to a patent information retrieval system for retrieving patent information relating to the patents, in the same way as in FIGS. 3 and 4.

FIGS. 5 and 6 show the construction of the embodiment when retrieval is restarted after the server computer 22 associated with the server application enters the abnormal end state and retrieval is interrupted.

As shown in these structural views of the embodiment, particularly in FIG. 6, a trigger 9 for reutilizing the retrieval condition expression holding file 15 shown in FIG. 3 is provided to a screen D3 for inputting the retrieval conditions (corresponding to the screen D1 in FIG. 4) when the user again makes a retrieval. When the user U selects this trigger 9, the screen control unit 13 reads the expressions about the retrieval conditions from the retrieval condition expression holding file 15 (the flow of signals 5b). The expressions about the retrieval conditions thus read are transmitted to the database access unit 26 through the client communication unit 14 and the server communication unit 15 (the flow of signals 5c). Further, this database access unit 26 retrieves the patent information database 27 (the flow of signals 5d). The results of this retrieval are transmitted to the screen control unit 13 through the server communication unit 25 and the client communication unit 14 (the flow of signals 5e). At this time, the screen control unit 13 displays the results of retrieval on the screen D4 for inputting the expressions about the retrieval conditions (corresponding likewise to the screen D1 in FIG. 4) as represented by oblique line portions in FIG. 6 (the flow of signals 5f).

When restarting the patent information retrieval in accordance with the flow of signals described above, the user U need not input again from the very beginning the expressions about the retrieval conditions but can restore the retrieval system to the state which the patent information retrieval is interrupted. In other words, the user U can easily restart the retrieval operation.

In this case, a series of expressions about the retrieval conditions are sequentially stored one by one in the retrieval condition expression holding file 15 and are displayed on the screen. Therefore, even if the server application suddenly enters the abnormal end state, the expressions about the retrieval conditions immediately before the abnormal end are reliably left in the retrieval condition expression holding file 15, and the danger, in which a part of the expressions about the retrieval conditions is erroneously erased due to the occurrence of the abnormal end, hardly exists.

In the embodiments shown in FIGS. 3 to 6, the client application (screen control unit 13 and client communication unit 14) and the server application (server communication unit 25 and database access unit 26) include separate computers, and the construction of the information retrieval system for mutual communication between these computers by utilizing the communication line such as the LAN has been described.

However, the function of the present invention at the time of restart of information retrieval can be provided to an information retrieval system wherein the client application and the server application are disposed on the same computer.

Figure 8A:
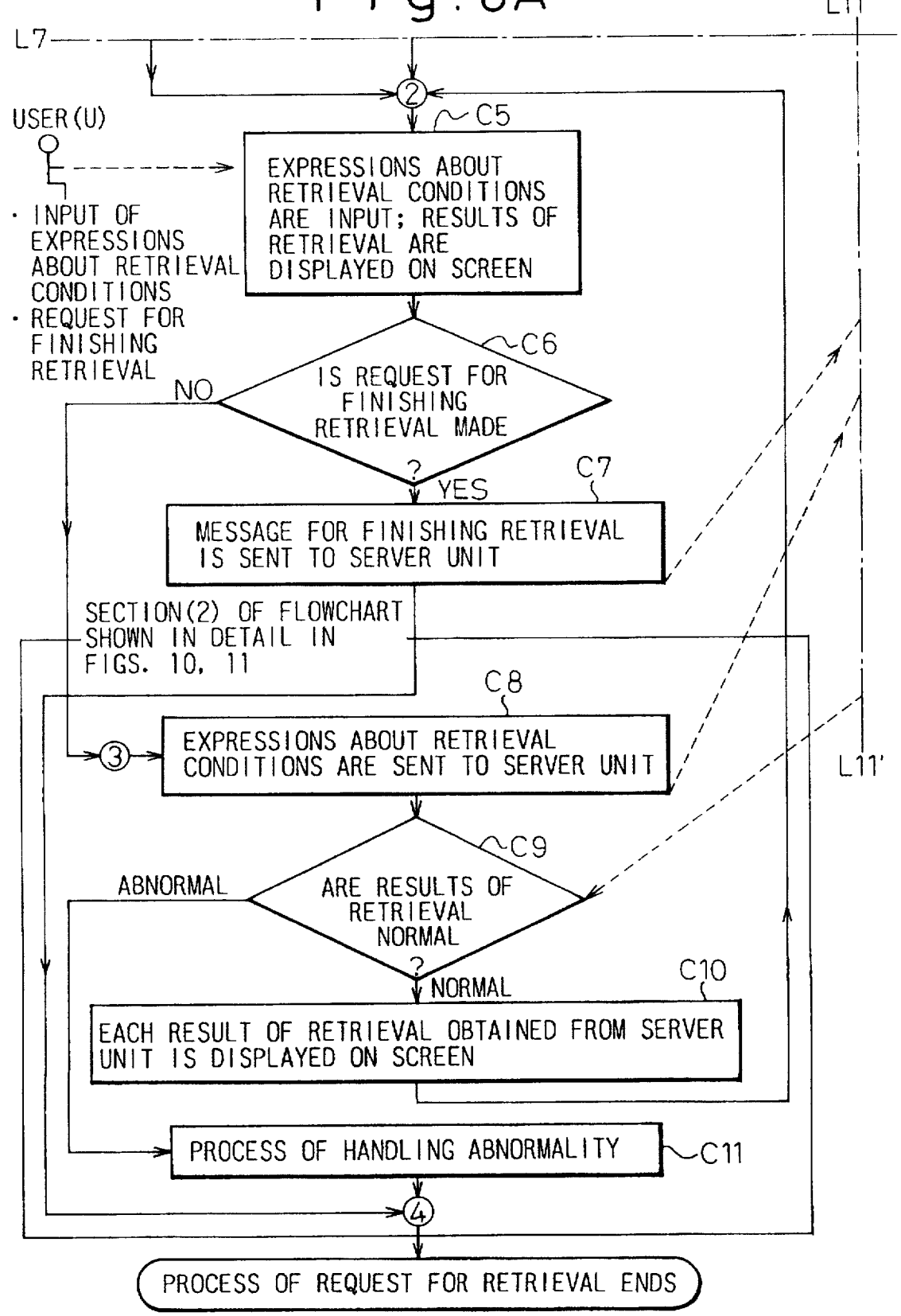
FIG. 8A is a flowchart for explaining the overall process flow No. 2 in a concrete embodiment of the present invention.
Figure 8B:
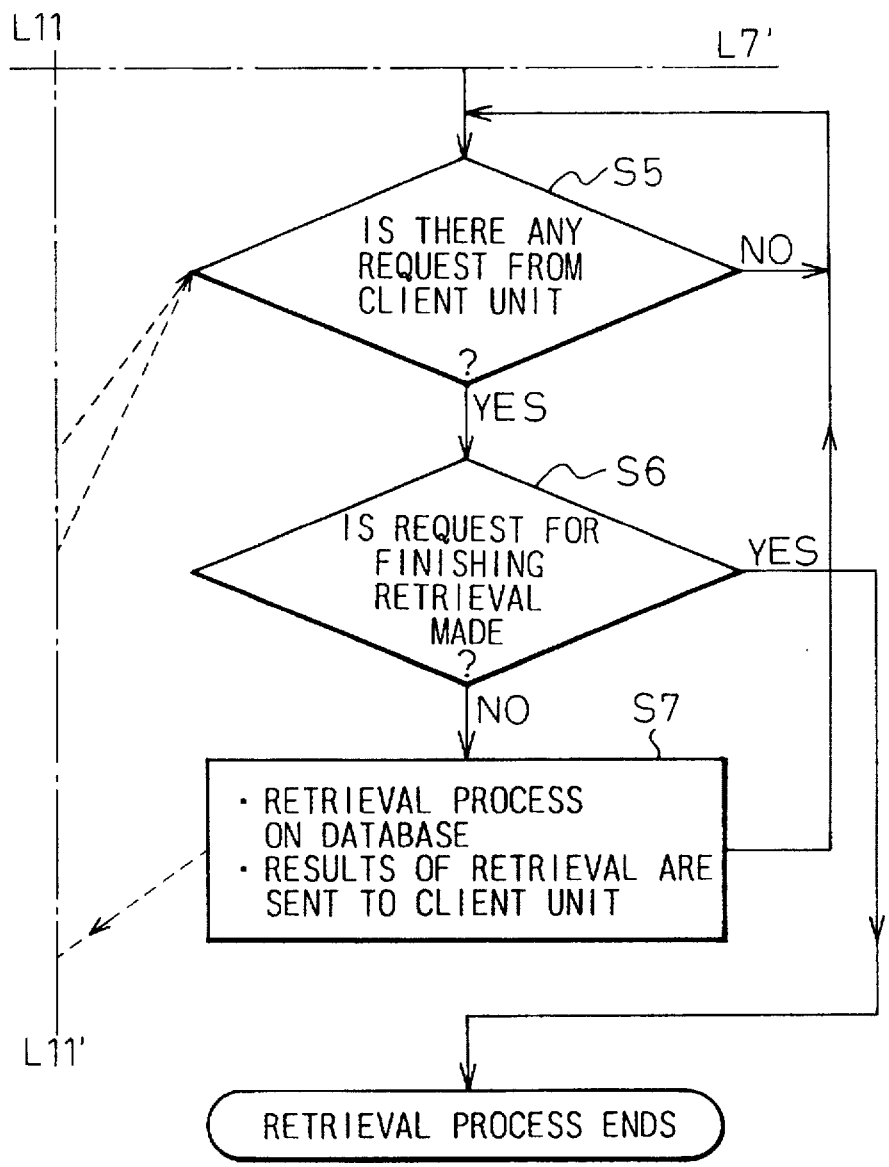
FIG. 8B is a flowchart for explaining the overall process flow No. 3 in a concrete embodiment of the present invention.

FIGS. 7, 8A and 8B are flowcharts for explaining the overall process flows Nos. 1, 2 and 3 of an embodiment of the present invention, respectively. The explanation will be hereby given sequentially on a series of the operations on the client application side and the server application side in the embodiment of the information retrieval system shown in FIGS. 2A and 2B.

As shown in FIG. 7, when information retrieval for retrieving the object information is requested to the server application side at the step C1 on the client application side (process of request for retrieval), the user U raises a connection request for the server application of the server unit through the socket-type monitoring unit (step C2).

On the other hand, a server manager accepts the request for information retrieval from the client application of the client unit at step S1 on the server application side. On this client application side, further, whether or not the connection request is raised from the client unit is always monitored (step S2). When the signal of the connection request of the server unit for the server application is transmitted from the client unit, the server application side activates the retrieval process (step S3) and prepares for the reception of the expressions about the retrieval conditions from the client application (step S4).

Further, whether or not a recovery judgement process (usually referred to as recovery process) for recovering the client/server model to the state when information retrieval is interrupted is necessary, that is, whether or not the state is under the state of restart of retrieval at present, is judged at the step C3 on the client application side. If the state is the state of the restart of retrieval, the recovery judgement process is judged as necessary and is executed (step C4). The detail of this recovery judgement process (flow section (1)) will be later described with reference to FIG. 9.

If the state is not the state of the restart of retrieval, the expressions about the retrieval conditions inputted by the retrieval instruction from the user U are displayed on the screen of the display at the step C5 of FIG. 8A. Further, the results of retrieval executed by the server application on the basis of the retrieval condition expressions sent to the server unit are also displayed on the screen of the display.

The explanation will be given in further detail. In FIG. 8A, unless any abnormality in communication occurs in the server application of the server unit and the operation enters the abnormal end (step C6), the expressions about the retrieval conditions are continuously transmitted to the server unit (step C8). At the steps S5 to S7 on the server application side in FIG. 8B, on the other hand, the database storing the information as the object of retrieval is searched in accordance with the request of the client application, and the results of retrieval, obtained from this database, are sent back to the client unit.

Here, if any abnormality in communication occurs in the server application of the server unit and the operation enters the abnormal end, this state of the abnormal end is detected by the socket-type monitoring unit of the client unit, and an interrupt of the request for finishing the retrieval is generated from the client unit to the server unit and the message for finishing retrieval is sent (steps C6 and C7 in FIG. 8A).

After receiving the message for finishing retrieval described above through the socket-type monitoring unit, the server application side submits the request for finishing retrieval to the server unit as a whole and immediately finishes the retrieval process (steps S5 and S6 in FIG. 8B).

Judgement as to whether or not the results of retrieval, that are sequentially sent from the server unit to the client during the retrieval process by the server unit, are normal is executed by the periodical reception process by the client application (step C9 in FIG. 8A). As long as each of the results of retrieval so received is judged as normal, each result of retrieval from the server unit is sequentially displayed on the screen for inputting the expressions about the retrieval conditions or on the screen for inputting the results of retrieval (step C10 in FIG. 8A). When each result of retrieval received is judged as abnormal, however, a suitable process of handling abnormality is executed by judging that any abnormality in communication occurs in the server application of the server unit (step C11 in FIG. 8A). The detail of the detection of abnormality in communication in the server unit and the process of handling this abnormality [steps C8 to C11 in FIG. 8A; flow section (2)] will be described later with reference to FIGS. 10 and 11.

Figure 9:
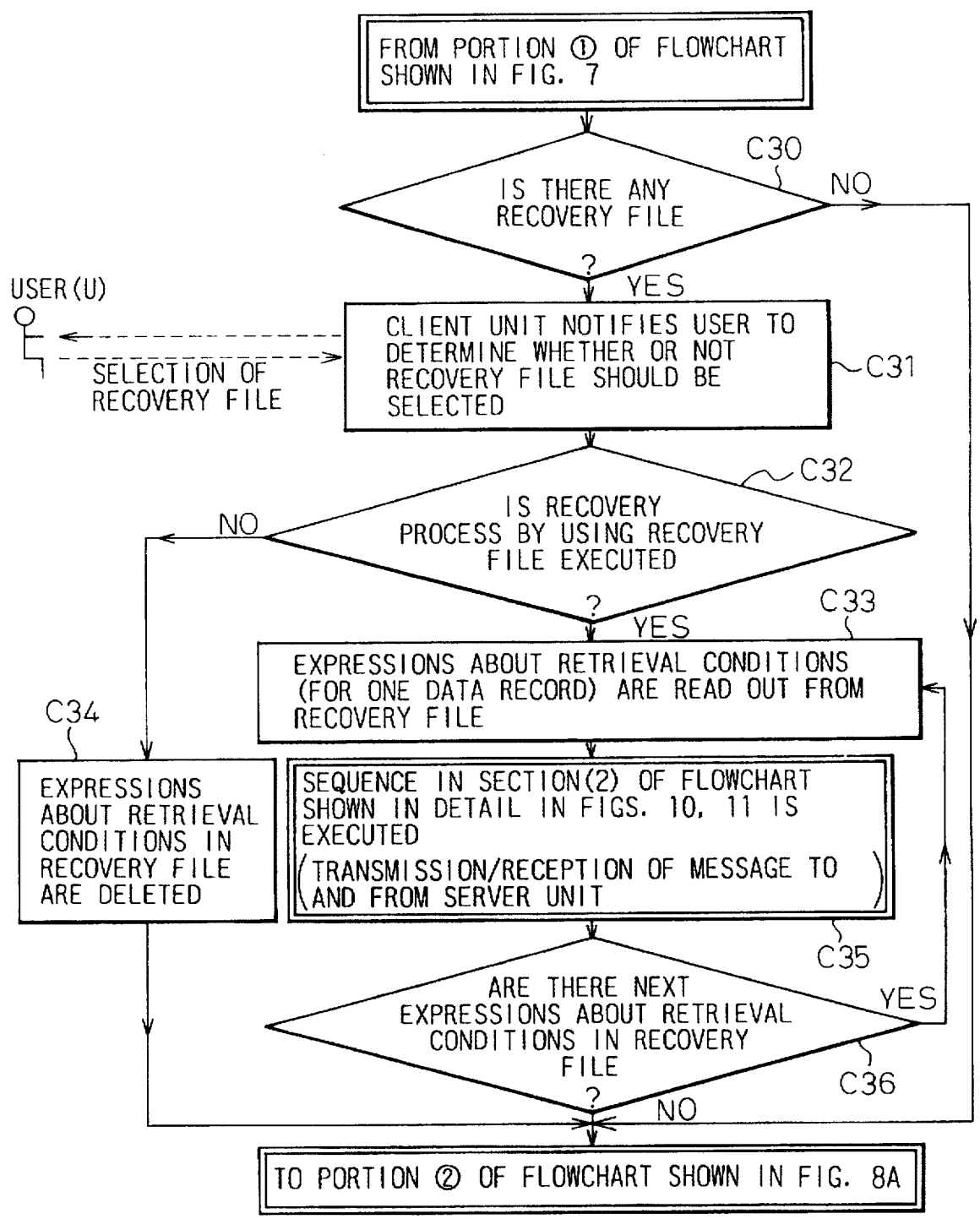
FIG. 9 is a flowchart for explaining in detail the operation of the flow section (1) in FIG. 7.

FIG. 9 is a flowchart useful for explaining in detail the operation of the flow section (1) in FIG. 7. Here, the recovery judgement process at the restart of retrieval [overall process flow ① (i.e., portion ① of the flowchart) in FIG. 7] will be explained in detail.

In this case, distinction between the recovery file used for holding the retrieval condition expressions when any abnormality in communication occurs and the ordinary file used for holding the retrieval condition expressions when the server unit operates normally is effected by the index or the file name added to the expressions about the retrieval conditions. The expressions about the retrieval conditions in the retrieval condition expression holding file can be easily utilized at the restart of retrieval by following this index, etc.

When the recovery judgement process at the time of restart of retrieval is executed, whether or not the recovery file exists is first checked at step C30 in FIG. 9. When the existence of this recovery file is confirmed, the user U is requested to decide whether or not this recovery file is employed (step C31). When the user U adopts the recovery file (step C32), the expressions about the retrieval conditions for one record are read out from this recovery file (read operation, step C33). Further, the flow proceeds to the flow section (2) (refer to FIGS. 10 and 11) at step C35, and transmission/reception of the message (including the expressions about the retrieval conditions for one record) to the server unit is executed. This transmission/reception of the message to the server unit is continued until the expressions about the retrieval conditions for the next record no longer exists inside the recovery file (step C36). When the operation of step C36 is finished, the flow returns to the overall process flow ② (i.e., portion ② of the flowchart) of FIG. 8A.

When the user U does not adopt the recovery file, as being unnecessary (step C32), the expressions about the retrieval conditions on the recovery file are erased (or deleted) (step C34) and the recovery judgement process is finished. After the operation of step C34 is finished, the flow returns to the overall process flow ② of FIG. 8.

Figure 10:
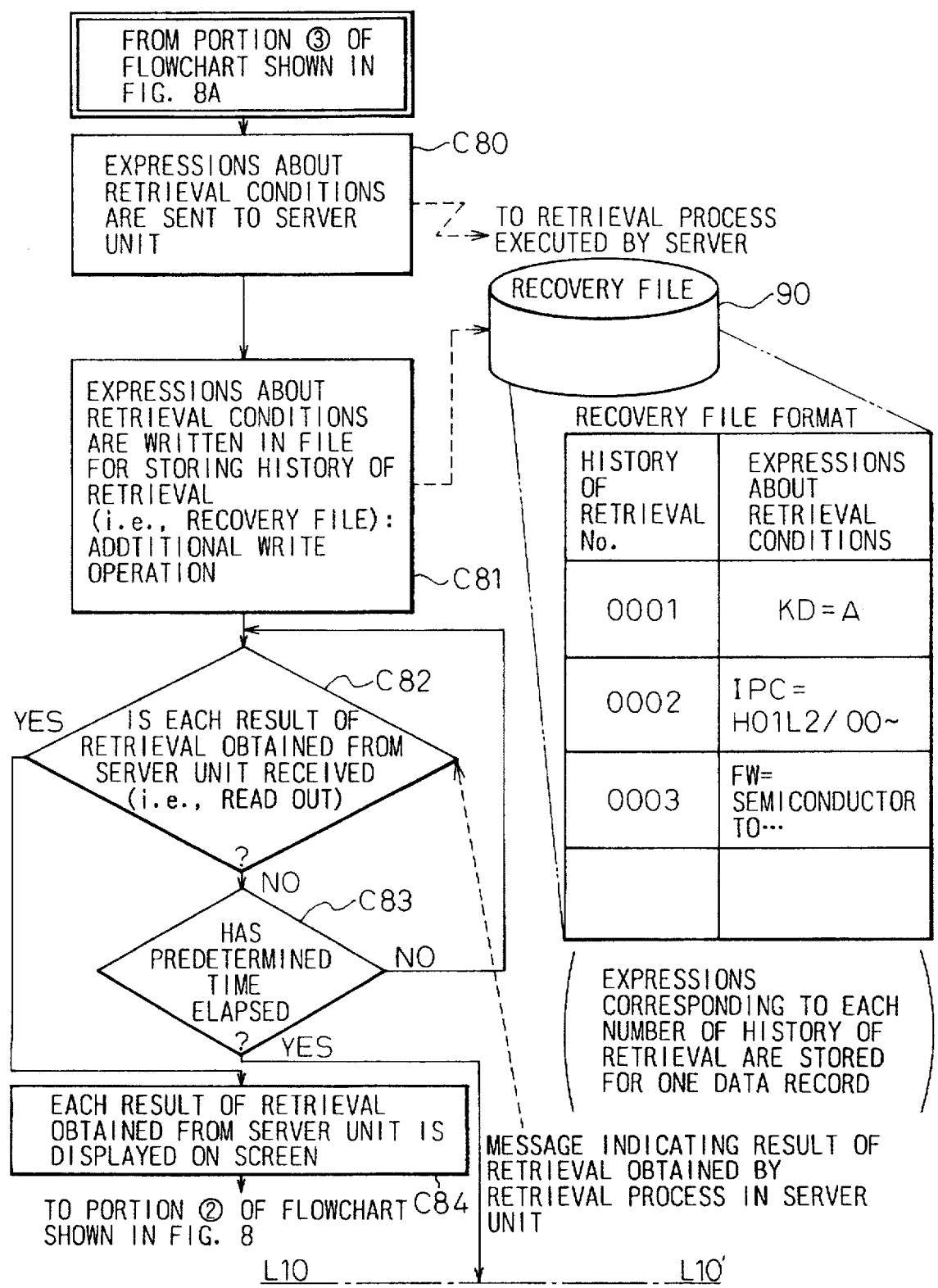
FIG. 10 is a flowchart for explaining in detail the operation of the first portion in the flow section (2) in FIG. 8A.
Figure 11:
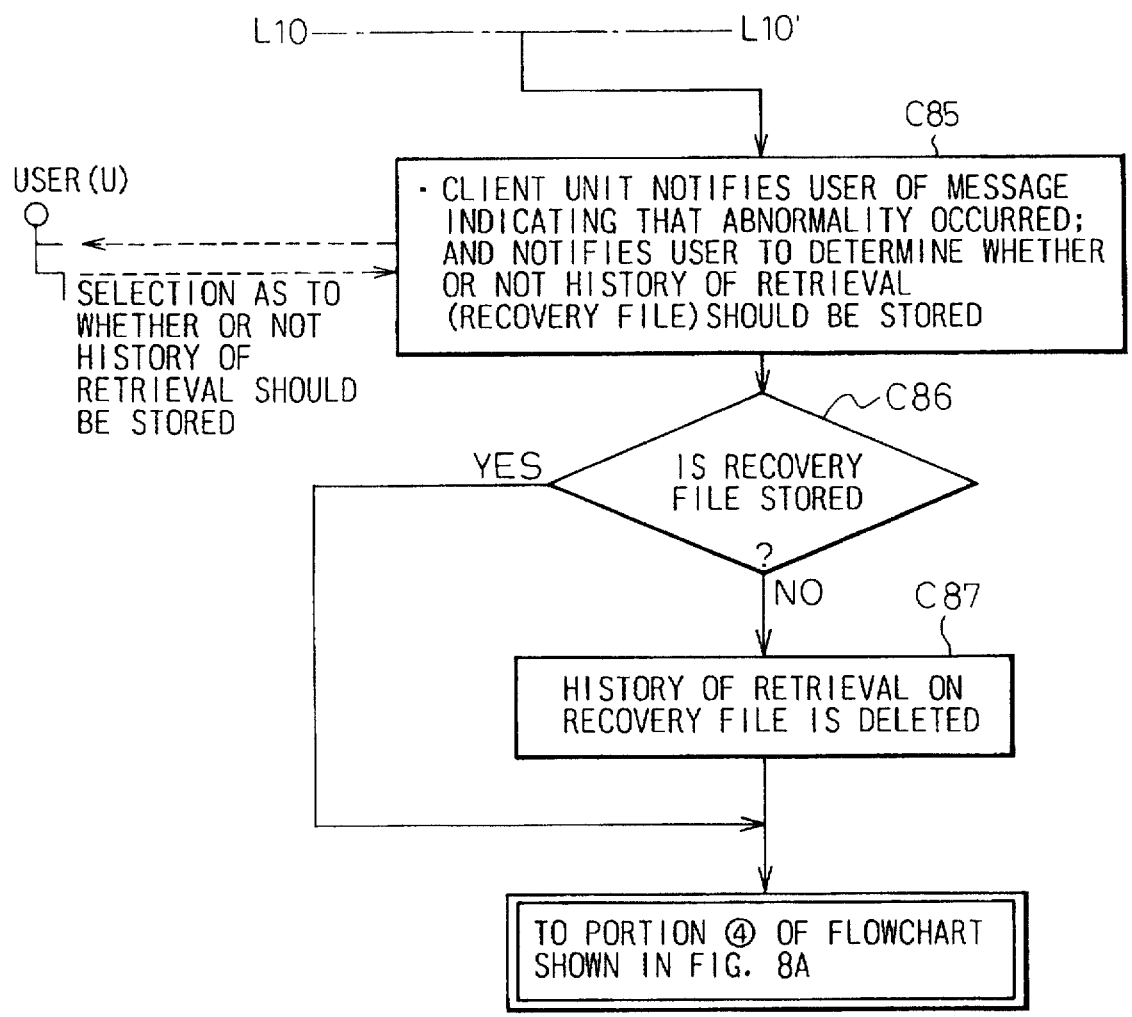
FIG. 11 is a flowchart for explaining in detail the operation of the second portion in the flow section (2) in FIG. 8A.

FIGS. 10 and 11 are flowcharts useful for explaining in detail the operations of the first and second portions of the flow section (2) in FIG. 8A, respectively. Here, a detection of an abnormality in communication of the server unit and the abnormal handling process [from overall process flow ③ (i.e., portion ③ of the flowchart) of FIG. 8A] will be explained in detail.

When the client unit requests the server unit to process information retrieval for retrieving the objective information, the expressions about the retrieval conditions relating to this information retrieval are sent to the server application of the server unit (step C80). The server application side executes the server retrieval process on the basis of these expressions about the retrieval conditions. Further, the expressions about the retrieval conditions obtained from the server retrieval process are additionally written into the file for holding the retrieval history, that is, into the recovery file (write operation, step C81). An example of the recovery format additionally written into the recovery file 90 is shown in the right portion of FIG. 10. Here, the number representing the history of retrieval and the corresponding expressions about the retrieval conditions are stored in the table inside the recovery file. In other words, the history of retrieval can be easily recognized because the expressions about the retrieval conditions for one retrieval operation are stored in the one record unit.

Further, whenever each of the results of retrieval from the server retrieval process is transmitted as a message to the client unit, this message is received and read out by the client application of the client unit (read operation, step C82). This read operation on the client application side is executed in every predetermined time interval (step C83), and each result of retrieval from the server unit on the basis of this read operation is sequentially displayed on the screen for inputting the retrieval condition expressions or on the screen for inputting the result of retrieval (step C84). If the result of retrieval is not received even after the passage of predetermined time, the client application side notifies the user U that any abnormality in communication has occurred (abnormality message) in the server unit. At the same time, the user U is notified and requested to decide whether or not the history of retrieval on the recovery file is stored as such.

Here, when the user U stores as such the history of retrieval inside the recovery file (step C86), the flow returns to the overall process flow ④ (i.e., portion ④ of the flowchart) in FIG. 8A, and the history of retrieval inside the recovery file is stored so that it can be utilized again at the restart of retrieval.

On the other hand, when the user U does not store the history of retrieval inside the recovery file (step C86), the history of retrieval on the recovery file is deleted at step C87 and then the flow returns to the overall process flow ④ in FIG. 8A.

As described above, according to the preferred embodiments of the present invention, restoration of the operation due to accidental interruption of retrieval can be easily accomplished in the information retrieval system in which the user inputs large quantities of complicated retrieval conditions such as the patent information retrieval system of the client/server model. Therefore, the user need not input once again the expressions about the retrieval conditions by consuming a long time. As a result, the present invention can improve the operation factor of the information retrieval system for the user and the efficiency of the operation at the restart of the operation particularly when the quantities of information to be retrieved become larger.

We claim:

1. An information retrieval system of a client/server model for effecting mutual communication between a client unit for instructing information retrieval for retrieving an objective information and a server unit for accepting information retrieval instructed from said client unit, wherein said client unit includes:

abnormality-in-communication detecting means for detecting an occurrence of an abnormality in communication between said client unit and said server unit;

retrieval condition holding means for holding retrieval conditions relating to information retrieval, that have been inputted up to a point of interruption of said information retrieval, when said client/server model enters a state of an abnormal end or a compulsive end due to an abnormality in communication and said information retrieval is interrupted, said client unit erasing said retrieval conditions held by said retrieval condition holding means when said retrieval conditions held by said retrieval condition holding means are judged as unnecessary; and retrieval requesting means for reading out said retrieval conditions from said retrieval condition holding means and transmitting said retrieval conditions to said server unit, when said retrieval conditions held by said retrieval condition holding means are judged as necessary and when said interrupted information retrieval is started again, wherein said server unit includes retrieving means for executing information retrieval on the basis of said retrieval conditions read out from said retrieval condition holding means.

2. An information retrieval system of a client/server model for effecting mutual communication between a client unit for instructing information retrieval for retrieving an objective information and a server unit for accepting information retrieval instructed from said client unit, wherein said client unit includes:

abnormality-in-communication detecting means for detecting an occurrence of an abnormality in communication between said client unit and said server unit;

retrieval condition holding means for holding retrieval conditions relating to information retrieval, that have been inputted up to a point of interruption of said information retrieval, when said client/server model enters a state of an abnormal end or a compulsive end due to an abnormality in communication and said information retrieval is interrupted; and retrieval requesting means for reading out said retrieval conditions from said retrieval condition holding means and transmitting said retrieval conditions to said server unit, when said retrieval conditions held by said retrieval condition holding means are judged as necessary and when said interrupted information retrieval is started again, wherein said server unit includes retrieving means for executing information retrieval on the basis of said retrieval conditions read out from said retrieval condition holding means;

display means for displaying said retrieval conditions and results of retrieval of said server unit corresponding to said retrieval conditions.

3. An information retrieval method, comprising:

detecting an occurrence of an abnormality in communication between a client unit and a server unit;

storing retrieval conditions relating to information retrieval, that have been input up to a point of interruption of the information retrieval, when a client/server model enters a state of an abnormal and/or a compulsive end due to an abnormality in communication and the information retrieval is interrupted;

erasing the stored retrieval conditions when the retrieval conditions are judged as unnecessary;

reading out the retrieval conditions and transmitting the retrieval conditions to the server unit, when the retrieval conditions are judged as necessary and when the interrupted information retrieval is started again.

* * * * *